US009445269B2

(12) United States Patent
Jiang

(10) Patent No.: US 9,445,269 B2
(45) Date of Patent: Sep. 13, 2016

(54) TERMINAL IDENTITY VERIFICATION AND SERVICE AUTHENTICATION METHOD, SYSTEM AND TERMINAL

(71) Applicant: ZTE Corporation, Shenzhen, Guangdong (CN)

(72) Inventor: Xiao Jiang, Shenzhen (CN)

(73) Assignee: ZTE CORPORATION, Shenzhen, Guangdon (CN)

( * ) Notice: Subject to any disclaimer, the term of this patent is extended or adjusted under 35 U.S.C. 154(b) by 0 days.

(21) Appl. No.: 14/417,024

(22) PCT Filed: Jul. 17, 2013

(86) PCT No.: PCT/CN2013/079552
§ 371 (c)(1),
(2) Date: Jan. 23, 2015

(87) PCT Pub. No.: WO2014/015759
PCT Pub. Date: Jan. 30, 2014

(65) Prior Publication Data
US 2015/0208238 A1    Jul. 23, 2015

(30) Foreign Application Priority Data

Jul. 24, 2012  (CN) .......................... 2012 1 0257464

(51) Int. Cl.
| H04L 29/06 | (2006.01) |
| H04W 12/06 | (2009.01) |
| H04L 9/32 | (2006.01) |

(52) U.S. Cl.
CPC .............. H04W 12/06 (2013.01); H04L 9/321 (2013.01); H04L 63/0823 (2013.01); H04L 63/0853 (2013.01); H04L 63/0876 (2013.01)

(58) Field of Classification Search
CPC .. H04W 12/06; H04L 63/0876; H04L 9/321; H04L 63/0853; H04L 63/0823
See application file for complete search history.

(56) References Cited

U.S. PATENT DOCUMENTS

2006/0059344 A1*  3/2006  Mononen .............. H04L 63/061
                                                          713/171
2007/0186115 A1    8/2007  Gao
(Continued)

FOREIGN PATENT DOCUMENTS

| CN | 1691578 A | 11/2005 |
| CN | 1764296 A | 4/2006 |

(Continued)

OTHER PUBLICATIONS

Supplementary European Search Report in European application No. 13823645.0, mailed on Sep. 17, 2015.
(Continued)

Primary Examiner — Jeffrey Pwu
Assistant Examiner — William Corum, Jr.
(74) Attorney, Agent, or Firm — Oppedahl Patent Law Firm LLC

(57) ABSTRACT

Disclosed is a method for terminal identity verification and service authentication. After initiating a service request, the terminal generates a user unique code according to user-specific information in an SIM card, and encrypts a name of the user-specific information, and then transmits the encrypted name of the user-specific information together with the user unique code to a credible cloud control center; a service provider generates a unique code according to its own specific information, and transmits an encrypted name of its own specific information together with the generated unique code to the credible cloud control center; and the credible cloud control center authenticates the terminal and the service provider according to their respective unique codes, and when determining that both of them pass the authentication, transmits a communication code to both of them so that they communicate with each other according to the communication code to complete a current service.

5 Claims, 3 Drawing Sheets

(56) References Cited

U.S. PATENT DOCUMENTS

| | | | |
|---|---|---|---|
| 2008/0137861 A1* | 6/2008 | Lindmo | G06F 21/31 380/270 |
| 2009/0287922 A1* | 11/2009 | Herwono | H04L 9/0822 713/155 |
| 2010/0162370 A1 | 6/2010 | Altay | |
| 2010/0218241 A1* | 8/2010 | Faryna | G06F 21/35 726/5 |
| 2011/0099616 A1 | 4/2011 | Mazur | |
| 2013/0086388 A1* | 4/2013 | Tesch | G06F 21/45 713/183 |
| 2013/0208893 A1* | 8/2013 | Shablygin | H04L 9/0822 380/277 |
| 2013/0226812 A1* | 8/2013 | Landrok | G06Q 20/4016 705/67 |
| 2014/0007196 A1* | 1/2014 | Lin | G06F 21/31 726/4 |
| 2014/0181948 A1 | 6/2014 | Mazur et al. | |
| 2014/0237240 A1* | 8/2014 | Shakkarwar | G06Q 20/02 713/168 |
| 2014/0304780 A1* | 10/2014 | Kuang | H04L 63/06 726/4 |

FOREIGN PATENT DOCUMENTS

| | | |
|---|---|---|
| CN | 101588579 A | 11/2009 |
| CN | 102316080 A | 1/2012 |
| CN | 102571702 A | 7/2012 |
| CN | 102761870 A | 10/2012 |

OTHER PUBLICATIONS

International Search Report in international application No. PCT/CN2013/079552, mailed on Oct. 24, 2013.

English Translation of the Written Opinion of the International Search Authority in international application No. PCT/CN2013/079552, mailed on Oct. 24, 2013.

\* cited by examiner

TERMINAL IDENTITY VERIFICATION AND SERVICE AUTHENTICATION METHOD, SYSTEM AND TERMINAL

TECHNICAL FIELD

The disclosure relates to information security techniques in a mobile communication system, and in particular to a method and system for terminal identity verification and service authentication and a terminal.

BACKGROUND

Traditional security strategies for mobile communication terminals are mainly focused on the field of single host, that is to say, they are security strategies for single-user-single-host mobile communication terminals, i.e., a user performs security management on terminal equipments held by himself/herself. The above security strategies mainly include local security management such as validity check of a user terminal equipment, for example, a user sets a power-on password for a terminal so that an invalid user cannot start the terminal; management of function accessibility, for example, restriction on browsing information stored in a terminal equipment; and encryption of private information, for example, encryption of files. These security strategies do not involve aspects such as wireless transmission of user information, user identification, and authentication of services provided to uses by a service provider.

At present as the development of communication techniques, various wireless applications increase rapidly, but important information of terminal users would be in danger during wireless transmission since information security is not perfect in the field of mobile communications, which indicates many disadvantages of security strategies of mobile equipment. Furthermore, with the popularity of smart terminals and the coverage of 3G networks, there are more and more applications which provide users with services via 3G networks, thus worsening the current information security status.

As to all existing 3G-network-based services, wireless transmission of personal private information of terminal users has to be used to determine whether the services can be implemented, that is, a service provider authenticates terminals through personal private information of corresponding users. However, hackers or malicious saboteurs may easily intercept and acquire personal private information of users in wireless environment, thus resulting in huge damage to both users and service providers.

SUMMARY

In view of the above, embodiments of the disclosure are intended to provide a method and system for terminal identity verification and service authentication, and a terminal so that security of personal private information of terminal users can be ensured so as to avoid the information from malicious interception during its wireless transmission.

To this end, the technical solutions of embodiments of the disclosure are implemented as follows.

A method for terminal identity verification and service authentication includes:

after initiating a service request, the terminal generates a user unique code according to user-specific information in an SIM card, encrypts a name of the user-specific information, and then transmits the encrypted name of the user-specific information together with the user unique code to a credible cloud control center;

a service provider generates a unique code according to its own specific information, and transmits an encrypted name of its own specific information together with the generated unique code to the credible cloud control center; and the credible cloud control center authenticates the terminal and the service provider according to their respective unique codes, and when determining that both of them pass the authentication, transmits a communication code to the terminal and the service provider so that the terminal and the service provider communicate with each other according to the communication code to complete a current service.

Preferably, the generating the user unique code may include: the terminal generates the user unique code by calculating the user-specific information in the SIM card using a hash algorithm; the user-specific information in the SIM card may be a subset of a set of various user-specific information stored in the SIM card.

Preferably, the encrypting a name of the user-specific information may include: encrypting the name of the user-specific information using a Personal Identification Number (PIN).

Preferably, the authenticating by the credible cloud control center the terminal and the service provider according to their respective unique codes may include:

the credible cloud control center decrypts a name of user-specific information transmitted by the terminal, finds user-specific information in its own storage server corresponding to the decrypted name of the user-specific information and generates a corresponding character string using a hash algorithm, and compares the generated character string to the user unique code transmitted by the terminal, if the comparison indicates that they are the same, it indicates that the terminal passes the authentication, otherwise, it indicates that the terminal does not pass the authentication; and similarly, the credible cloud control center generates a character string corresponding to the decrypted name of service-provider-specific information using a hash algorithm, compares the character string to the unique code transmitted by the service provider, if the comparison indicates that they are the same, it indicates that the service provider passes the authentication, otherwise, it indicates that the service provider does not pass the authentication.

Preferably, the communication code may include an one-time secret key and a digital certificate.

Preferably, the method may further include: after the current service is completed, the terminal notifies the service provider and the credible cloud control center to delete the communication code and the unique code, i.e., notifying the service provider to delete the communication code and its own unique code, and notifying the credible cloud control center to delete the communication code and unique codes of the terminal and of the service provider.

A system for terminal identity verification and service authentication includes a terminal, a service provider and a credible cloud control center, wherein the terminal is configured to, after initiating a service request, generate a user unique code according to user-specific information in an SIM card, and after encrypting a name of the user-specific information, transmit an encrypted name of the user-specific information together with the user unique code to the credible cloud control center;

the service provider is configured to generate a unique code according to its own specific information and transmit an encrypted name of its own specific information together with the generated unique code to the credible cloud control center; and the credible cloud control center is configured to authenticate the terminal and the service provider according to their respective unique codes, and when determining that both of them pass the authentication, transmit a communication code to the terminal and the service provider so that the terminal and the service provider communicate with each other according to the communication code to complete a current service.

Preferably, the terminal may be further configured to, after the current service is completed, notify the service provider and the credible cloud control center to delete the communication code and the unique code, i.e., notify the service provider to delete the communication code and its own unique code, and notify the credible cloud control center to delete the communication code and unique codes of the terminal and of the service provider; accordingly, preferably, the service provider may be further configured to, after receiving a notification from the terminal, delete the communication code and its own unique code;

preferably, the credible cloud control center may be further configured to, after receiving a notification from the terminal, delete the communication code and unique codes of the terminal and of the service provider.

A terminal is provided, which is configured to, after initiating a service request, generate a user unique code according to user-specific information in an SIM card, encrypt a name of the user-specific information, and then transmit the encrypted name of the user-specific information together with the user unique code to a credible cloud control center.

Preferably, the terminal may be further configured to, after the current service is completed, notify the service provider and the credible cloud control center to delete the communication code and the unique code, i.e., notify the service provider to delete the communication code and its own unique code, and notify the credible cloud control center to delete the communication code and unique codes of the terminal and of the service provider.

In the method and system for terminal identity verification and service authentication and terminal provided by embodiments of the disclosure, after initiating a service request, the terminal generates a user unique code according to user-specific information in an SIM card, and after encrypting a name of the user-specific information, transmits the encrypted name of the user-specific information together with the user unique code to a credible cloud control center; a service provider generates a unique code according to its own specific information, and transmits an encrypted name of its own specific information together with the generated unique code to the credible cloud control center; and the credible cloud control center authenticates the terminal and the service provider according to respective unique codes, and when determining that both of them pass the authentication, transmits a communication code to the terminal and the service provider so that the terminal and the service provider communicate with each other according to the communication code to complete a current service. In embodiments of the disclosure, the user unique code is generated using information carried bin an existing SIM card without an increase of resources of a user's existing terminal, a method for calculating the unique code is a hash algorithm, since this algorithm has irreversibility, a malicious user cannot acquire any useful information from a unique code even though the unique code is intercepted, thereby ensuring security of user information and avoiding the user from being impersonated. Furthermore, during the whole service process according to embodiments of the disclosure, a communication code is used all the time to encrypt communication data between the terminal and the service provider, thereby ensuring security of information of the user terminal and the service provider.

Different from operations in traditional application scenarios such as acquiring a digital certificate and completing digital signing that need to be supported by specific hardware devices, embodiments of the disclosure are implemented by inter-communication between a user terminal, a service provider and a credible cloud control center, and a user does not need to purchase new software devices, and therefore implementation of the method of embodiments of the disclosure can lower cost of the user.

In addition, in embodiments of the disclosure, after the current service is completed, the terminal notifies the service provider and the credible cloud control center to delete the communication code and unique codes, thus further ensuring security of information of the user terminal and the service provider.

DETAILED DESCRIPTION

In embodiments of the disclosure, after initiating a service request, the terminal generates a user unique code according to user-specific information in an SIM card, encrypts a name of the user-specific information, and then transmits the encrypted name of the user-specific information together with the user unique code to a credible cloud control center; a service provider generates a unique code according to its own specific information, and transmits an encrypted name of its own specific information together with the generated unique code to the credible cloud control center; and the credible cloud control center authenticates the terminal and the service provider according to their respective unique codes, and when determining that both of them pass the authentication, transmits a communication code to the terminal and the service provider so that the terminal and the service provider communicate with each other according to the communication code to complete a current service.

Preferably, after the current service is completed, the terminal notifies the service provider and the credible cloud control center to delete the communication code and the unique code.

Herein a name of the user-specific information is encrypted using a Personal Identification Number (PIN); and the communication code includes an one-time secret key and a digital certificate.

Embodiments of the disclosure will be further elaborated below in combination with accompanying drawings and specific embodiments.

Figure 1:
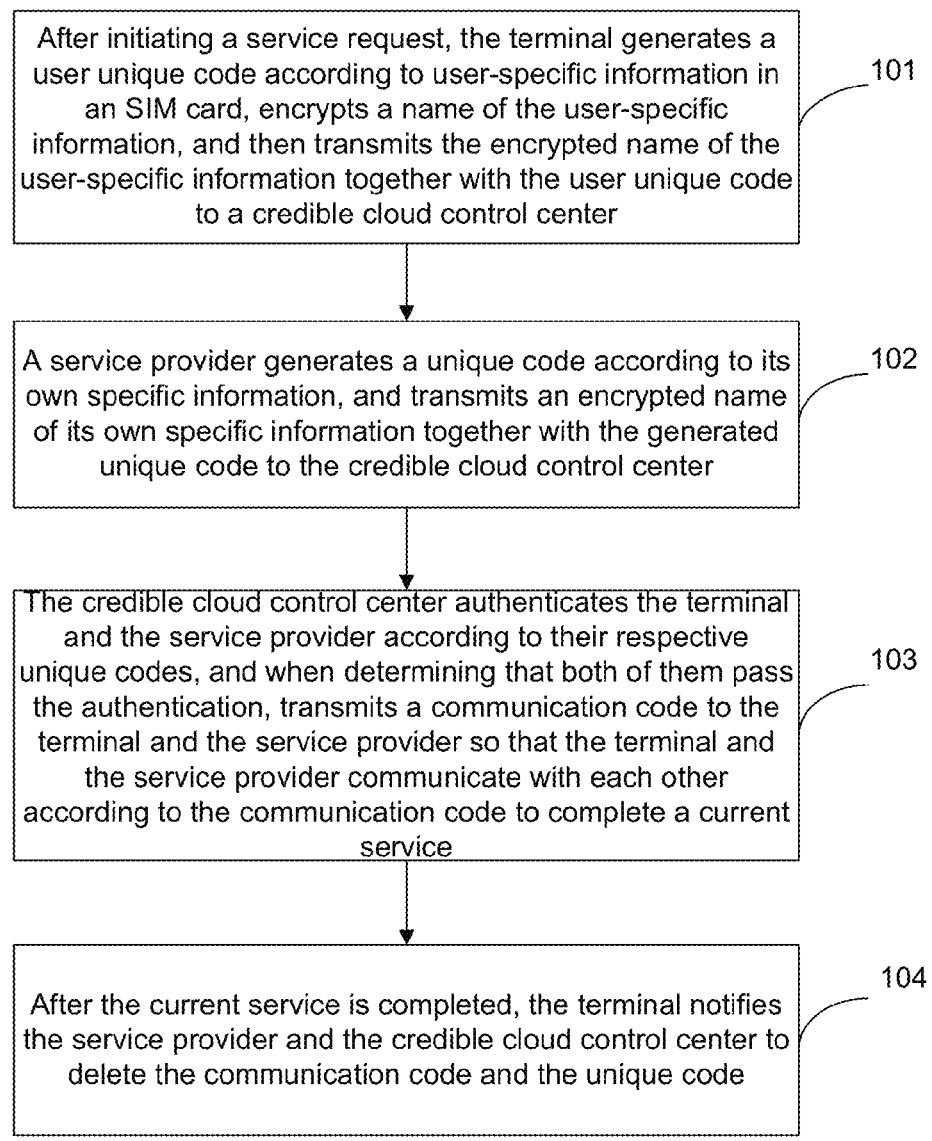
FIG. 1 is a schematic flow chart of a method for terminal identity verification and service authentication according to an embodiment of the disclosure.

FIG. 1 is a schematic flow chart of a method for terminal identity verification and service authentication according to an embodiment of the disclosure, as shown in FIG. 1, steps to implement the flow are as follows.

Step 101, after initiating a service request, the terminal generates a user unique code according to user-specific information in an SIM card, encrypts a name of the user-specific information, and then transmits the encrypted name of the user-specific information together with the user unique code to a credible cloud control center;

specifically, after initiating a service request, the terminal generates a user unique code using a hash algorithm according to user-specific information in an SIM card, including for example a PIN, International Mobile Subscriber Identity (IMSI), authentication key, Temporary Mobile Subscriber Identity (TMSI) and the like. In an embodiment, the user-specific information is a subset of a set of various user-specific information stored in the SIM card, that is, the user-specific information includes a part of information stored in the SIM card, and the terminal can select the type and quantity of information in the subset through an application provided by a service provider, for example, the service provider provides a user with a selection interface for user-specific information, where various user-specific information is listed so that the user can select some of them to form a set, i.e., the above subset, then the terminal generates a user unique code $W=f(X, Y \ldots, Z)$ according to a subset selected by the user, the function W can be generated using the hash algorithm but it is not limited to this algorithm.

Herein the reason why the hash algorithm is preferred is that the algorithm has irreversibility, thus a malicious user cannot acquire any useful information from a unique code even though the unique code is intercepted, thereby ensuring security of user information and avoiding the user from being impersonated. Furthermore, the hash algorithm also has uniqueness, and a user may obtain different unique codes once any element or the number of elements in the subset changes. In this way, it can ensure that the malicious cannot fabricate a user unique code through falsifying a subset of user-specific information and using a same hash algorithm.

Therefore, in embodiments of the disclosure, a new way of using a unique code based on user-specific information in an SIM card as key information during a security strategy process can ensure that a user identity cannot be impersonated and user information cannot be falsified.

Preferably, one unique code can be generated for each different service every time, i.e., a different combination way is selected every time from aforementioned selection interface for user-specific information to generate a new subset of user-specific information, then the subset is regarded as a calculation object of a hash algorithm to obtain an one-time user unique code that is random. In addition, the generation of a user unique code is independent of terminal equipments, and various services can be certainly implemented on different terminal equipments using a same SIM card.

After generating a user unique code, the terminal encrypts a name of the user-specific information and transmits the encrypted name of the user-specific information together with the user unique code to a credible cloud control center. Specifically, the name of the user-specific information corresponds to selected user-specific information when the user unique code is generated, that is to say, when a subset of user-specific information includes user-specific information of three users, then there will be three names of user-specific information desired to be encrypted. Herein the user-specific information is a specific value, for example, the value of an IMSI is a 15-digit decimal number, and the name of user-specific information is the IMSI itself.

Specifically, the name of user-specific information is transmitted to the credible cloud control center for subsequent authentication of the terminal by the credible cloud control center; an encryption algorithm of the name of user-specific information is an existing encryption algorithm negotiated between the terminal and the credible cloud control center.

Step 102, a service provider generates a unique code according to its own specific information, and transmits an encrypted name of its own specific information together with the generated unique code to the credible cloud control center;

specifically, the service provider generates its own unique code according to specific information registered by the service provider itself in the credible cloud control center, such as ID, QR code and the like, the process is the same as the process for generating a user unique code and a hash algorithm is also used, thus the detailed description thereof will be omitted herein. Similarly, after encrypting the name of its own specific information, the server provider transmits the encrypted name of its own specific information together with the generated unique code to the credible cloud control center.

Step 103, the credible cloud control center authenticates the terminal and the service provider according to respective unique codes, and when determining that both of them pass the authentication, transmits a communication code to the terminal and the service provider so that the terminal and the service provider communicate with each other according to the communication code to complete a current service;

specifically, the credible cloud control center decrypts the name of user-specific information transmitted by the terminal, finds, according to the decrypted name of the user-specific information, corresponding user-specific information in its own storage server and generates a corresponding character string using a same hash algorithm, and compares the generated character string to a user unique code transmitted by the terminal, if a comparison result indicates that they are the same, it indicates that the terminal passes the authentication, otherwise, it indicates that the terminal does not pass the authentication. A process for authenticating the service provider by the credible cloud control center is the same as a process for authenticating the terminal, i.e., a corresponding character string is generated using a hash algorithm according to the decrypted name of service-provider-specific information, and the character string is compared to the unique code transmitted by the service provider, if a comparison result indicates that they are the same, it indicates that the service provider passes the authentication, otherwise, it indicates that the service provider does not pass the authentication.

After determining that both the terminal and the service provider pass the authentication, the credible cloud control center transmits a communication code for a current service to the terminal and the service provider respectively, and then the terminal and the service provider communicate with each other according to the communication to complete the current service. Herein the communication code includes but is not limited to an one-time secret key and digital certificate, and information transmitted between the terminal and the service provider during communication is desired to be encrypted with an one-time secret key in the communication code.

In an embodiment, the one-time secret key in the communication code may also be an one-time key, thus ensuring security of user information and avoiding user information from being maliciously falsified. Of course, it can also ensure authentication of services provided by the service provider by the terminal, and details thereof will be described in subsequent embodiments.

Preferably, embodiments of the disclosure may further include step 104: after the current service is completed, the terminal notifies the service provider and the credible cloud control center to delete the communication code and the unique code;

specifically, after the current service is completed, when determining that no other services are needed, the terminal may notify the service provider and the credible cloud control center to delete the communication code the current service and unique codes, i.e., notify the service provider to delete the communication code of the current service and its own unique code, and notify the credible cloud control center to delete the communication code of the current service and unique codes of both the terminal and the service provider. This step can further ensure the security and privacy of user information.

Through taking online banking services provided by a commercial bank as an example, the method according to embodiments of the disclosure will be described below, and the steps are as follows.

Step 1, a user terminal enters an application interface provided by a bank to initiate a service process, selects some user-specific information stored in an SIM card on a selection interface of the bank and obtains a user unique code through calculation using a hash algorithm; encrypts a name of the user-specific information using a PIN, transmits the encrypted name of the user-specific information together with the user unique code to a credible control center and transmits server request information to the bank.

Step 2, after receiving the service request information transmitted by the terminal, the bank obtains a unique code of the bank using a same hash algorithm as that of step 1 according to specific information registered by the bank itself in the credible cloud control center, encrypts a name of the specific information, and transmits the unique code and the encrypted name of the specific information to the credible cloud control center.

Step 3, the credible cloud control center obtains the name of the user-specific information and the name of the specific information of the bank through decryption, finds these specific information in its own storage server, and obtains respectively character strings corresponding to the terminal and the bank using a same hash algorithm; when the respective character strings are the same as unique codes of the terminal and the bank, then it is determined that both the terminal and bank have a legal identity, and the credible cloud control center transmits both the one-time secret key and the digital certificate used to encrypt service information, i.e., a communication code to the terminal and the bank respectively.

Step 4, after the terminal receives the communication code, a user signs a digital signature, and the terminal transmits the digital signature of the user to the bank;

in this step, the terminal also transmits the digital signature to the credible cloud control center so as to be stored therein, in this way, the Non-repudiation of the whole service process and thus practical benefits of the user and the bank can be ensured.

Step 5, after receiving the digital signature of the user, the bank completes identity verification of the user and service authentication; the bank encrypts specific service information and its own identity information using an one-time secret key issued by the credible cloud control center, transmits to the user terminal a set of encrypted information that can be referred to as a functional code.

Step 6, after receiving the functional code, the user terminal decrypts it and can verify the identity of the bank according to acquired identity information of the bank; then the user terminal further completes the service information and transmits encrypted service information to the bank.

Step 7, the bank checks detailed service information and completes the current service;

preferably, the bank authorizes corresponding rights to the user, and transmits encrypted inquiry information to the user terminal to enquire whether the user needs to add service items within respective rights.

Step 8, if the user needs further services, steps 6 to 7 are repeated, when the user agrees to complete the whole service, then an encrypted completion code is transmitted to the bank and the credible cloud control center, notifying them to delete the secret key and unique code of the current service.

Step 9, the bank receives the notification, determines that the service is completed, and discards the one-time secret key and its own unique code.

Step 10, after receiving the notification, the credible cloud control center discards the one-time secret key of the current service and unique codes of the terminal and of the bank.

Figure 2:
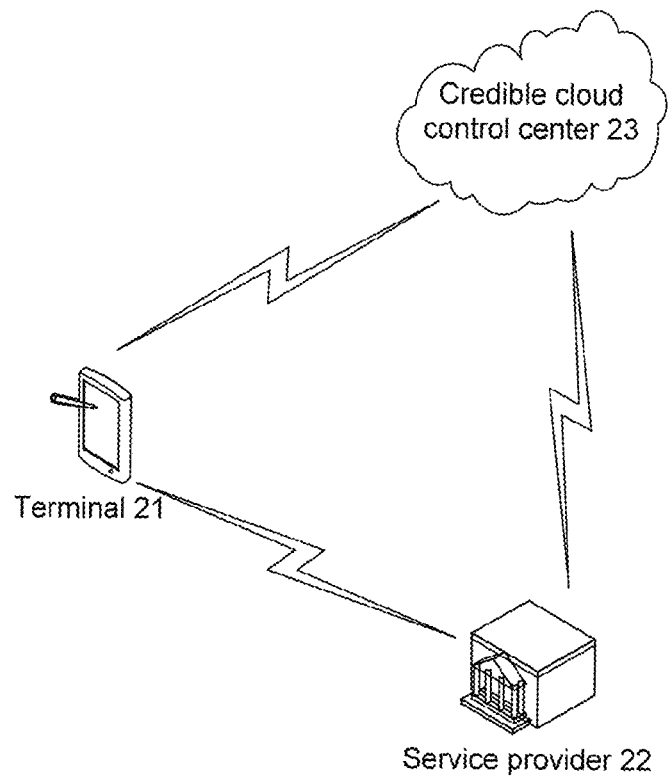
FIG. 2 is a schematic structural diagram of a system for terminal identity verification and service authentication according to an embodiment of the disclosure.

Embodiments of the disclosure further provide a system for terminal identity verification and service authentication, as shown in FIG. 2 the system includes a terminal 21, a service provider 22 and a credible cloud control center 23, wherein the terminal 21 is configured to, after initiating a service request, generate a user unique code according to user-specific information in an SIM card, encrypt a name of the user-specific information, and transmit the encrypted name of the user-specific information together with the user unique code to the credible cloud control center;

the service provider 22 is configured to generate a unique code according to its own specific information and transmit an encrypted name of its own specific information together with the generated unique code to the credible cloud control center; and the credible cloud control center 23 is configured to authenticate the terminal and the service provider according to their respective unique codes, and when determining that both of them pass the authentication, transmit a communication code to the terminal and the service provider so that the terminal and the service provider communicate with each other according to the communication code to complete a current service.

Preferably, the terminal 21 may be further configured to, after the current service is completed, notify the service provider and the credible cloud control center to delete the communication code and the unique code, i.e., notify the service provider to delete the communication code and its own unique code, and notify the credible cloud control center to delete the communication code and unique codes of the terminal and of the service provider; accordingly, the service provider 22 may be further configured to, after receiving a notification from the terminal, delete the communication code and its own unique code; and the credible cloud control center 23 may be further configured to, after receiving a notification from the terminal, delete the communication code and unique codes of the terminal and of the service provider.

Embodiments of the disclosure further provide a terminal, and the terminal is configured to, after initiating a service request, generate a user unique code according to user-specific information in an SIM card, and after encrypting a name of the user-specific information, transmit an encrypted name of the user-specific information together with the user unique code to a credible cloud control center.

Preferably, the terminal may be further configured to, after the current service is completed, notify the service provider and the credible cloud control center to delete the communication code and the unique code, i.e., notify the service provider to delete the communication code and its own unique code, and notify the credible cloud control center to delete the communication code and unique codes of the terminal and of the service provider.

Figure 3:
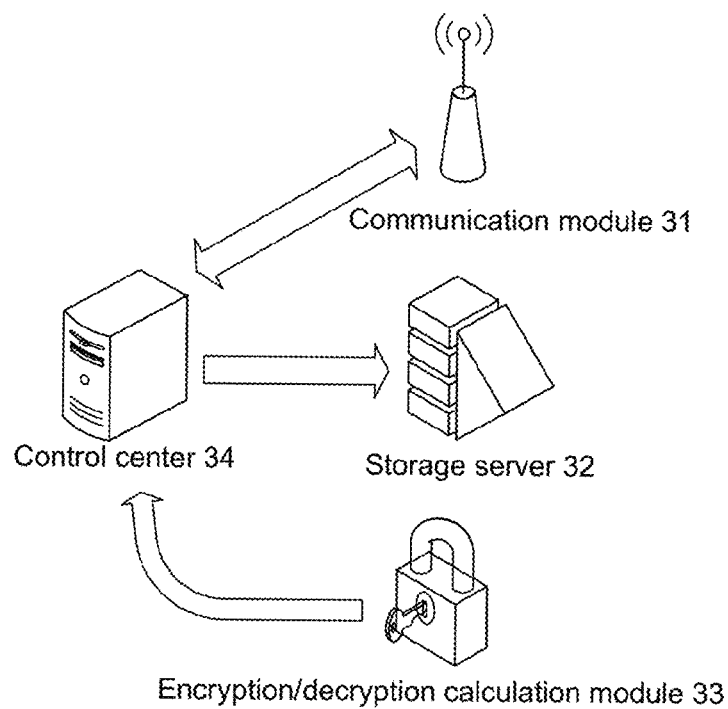
FIG. 3 is a schematic structural diagram of a service provider according to an embodiment of the disclosure.

A schematic structural diagram of a service provider according to an embodiment of the disclosure is as shown in FIG. 3, the service provider includes a communication module 31, a storage server 32, a encryption/decryption calculation module 33 and a control center 34.

During practical operation, the communication module 31 is configured to communicate with a terminal and a credible cloud control center and perform transmission of local data and data between the terminal and the credible cloud control center;

the storage server 32 is configured to store service-provider-specific information and a communication code and a unique code of the service provider itself;

the encryption/decryption calculation module 33 is configured to encrypt a name of the service-provider-specific information;

the control center 34 is configured to generate a unique code according to the service-provider-specific information and transmit, via the communication module, a generated unique code together with an encrypted name of the service-provider-specific information to the credible cloud control center; and the control center 34 is further configured to, after receiving the notification from the terminal, delete the communication code and its own unique code stored in the storage server.

Figure 4:
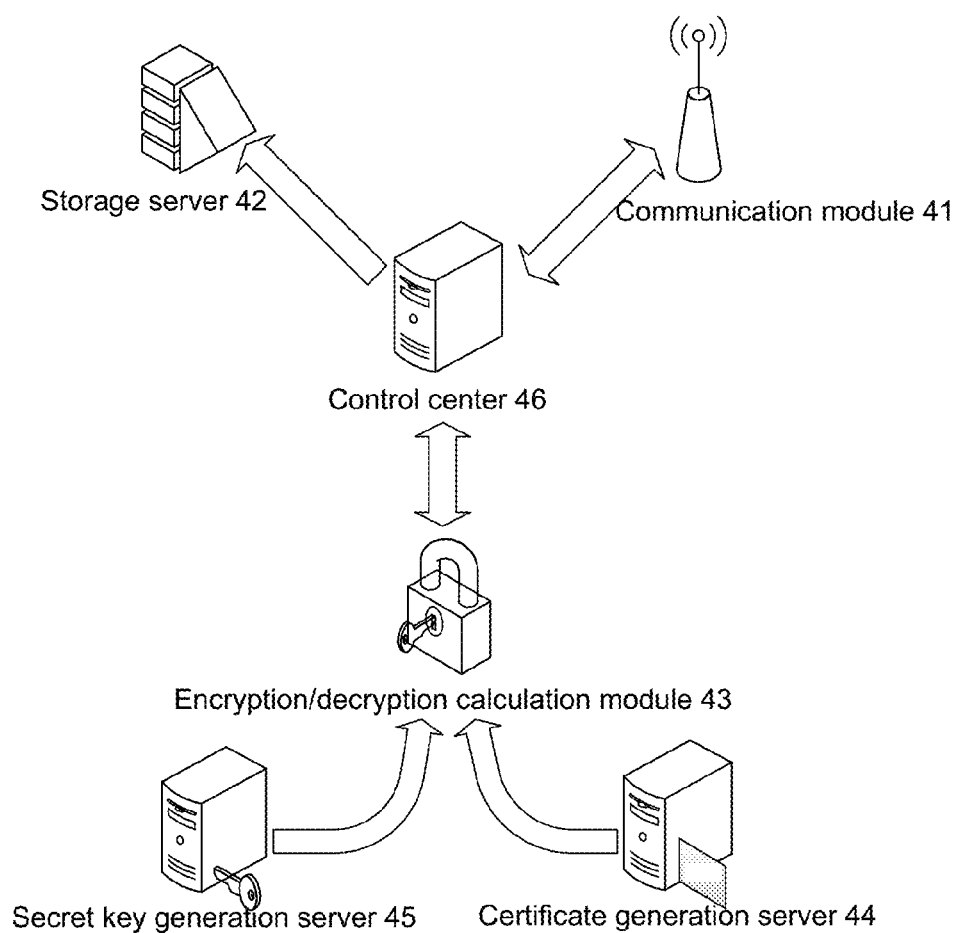
FIG. 4 is a schematic structural diagram of a credible cloud control center according to an embodiment of the disclosure.

A schematic structural diagram of a credible cloud control center according to an embodiment of the disclosure is as shown in FIG. 4, the credible cloud control center includes a communication module 41, a storage server 42, an encryption/decryption calculation module 43, a certificate generation server 44, a secret key generation server 45 and a control center 46.

During practical operation, the communication module 41 is configured to communicate with a terminal and a service provider and perform transmission of local data and data between the terminal and the service provider;

the storage server 42 is configured to store unique codes transmitted by the terminal and the service provider, an encrypted name of service-provider-specific information and an encrypted name of user-specific information of the terminal; store user-specific information of a registered terminal and service-provider-specific information; and store a communication code generated jointly by the certificate generation server and the secret key generation server;

the encryption/decryption calculation module 43 is configured to decrypt the encrypted name of service-provider-specific information and the encrypted name of user-specific information of the terminal;

the certificate generation server 44 is configured to generate a digital certificate in the communication code;

the secret key generation server 45 is configured to generate an one-time secret key in the communication code;

the control center 46 is configured to authenticate the terminal and the service provider according to respective unique codes, and when determining that both of them pass the authentication, transmit, via the communication module, a communication code to the terminal and the service provider; and the control center is further configured to, after receiving a notification from the terminal, delete the communication code and unique codes of the terminal and of the service provider stored in the storage server.

It should be noted that the terminal according to embodiments of the disclosure includes but is not limited to a Portable Application Description (PAD), smart phone, Ultra book, and it can also be applied to terminal products supporting 3G network services, such as a common mobile phone, data card and the like. Further, specific steps of the method according to the disclosure include but are not limited to what described above, newly-added steps or a simplified process can be defined for services having different security levels and application ranges.

What described are merely preferable embodiments of the disclosure, and are not intended to limit the disclosure.

The invention claimed is:

1. A method for terminal identity verification and service authentication, comprising:

after initiating a service request, generating, by a terminal, a user unique code according to user-specific information in a subscriber identity module (SIM) card, encrypting a name of the user-specific information, and then transmitting the encrypted name of the user-specific information together with the user unique code to a credible cloud control center;

generating, by a service provider, a unique code according to the service provider's specific information, and transmitting an encrypted name of the service provider's specific information together with the generated unique code to the credible cloud control center; and authenticating, by the credible cloud control center, the terminal and the service provider according to their respective unique codes, and when determining that both the terminal and the service provider pass the authentication, transmitting a communication code to the terminal and the service provider so that the terminal and the service provider communicate with each other according to the communication code to complete a current service, wherein the communication code comprises a one-time secret key and a digital certificate;

wherein the method further comprises:

notifying, by the terminal, the service provider to delete the communication code and the service provider's unique code, and notifying the credible cloud control center to delete the communication code and the unique codes of the terminal and of the service provider, after the current service is completed, wherein the authenticating by the credible cloud control center the terminal and the service provider according to their respective unique codes comprises:

decrypting, by the credible cloud control center, the name of user-specific information transmitted by the terminal, finding user-specific information in the credible cloud control center's storage server corresponding to the decrypted name of the user-specific information and generating a corresponding character string using a hash algorithm, and comparing the generated character string the user unique code transmitted by the terminal, wherein if the comparison indicates that they are the same, it indicates that the terminal passes the authentication, otherwise, it indicates that the terminal does not pass the authentication;

generating, by the credible cloud control center, a character string corresponding to the decrypted name of service-provider-specific information using a hash algorithm, comparing the character string to a unique code transmitted by the service provider, wherein if the comparison indicates that they are the same, it indicates that the service provider passes the authentication, otherwise, it indicates that the service provider does not pass the authentication.

2. The method for terminal identity verification and service authentication according to claim 1, wherein the generating the user unique code comprises:

generating, by the terminal, the user unique code by calculating the user-specific information in the SIM card using a hash algorithm, wherein the user-specific information in the SIM card comprises a subset of a set of various user-specific information stored in the SIM card.

3. The method for terminal identity verification and service authentication according to claim 1, wherein the encrypting a name of the user-specific information comprises:

encrypting the name of the user-specific information using a Personal Identification Number (PIN).

4. A system for terminal identity verification and service authentication, comprising a terminal, a service provider and a credible cloud control center, wherein the terminal is configured to, after initiating a service request, generate a user unique code according to user-specific information in an SIM card, encrypt a name of the user-specific information, and then transmit the encrypted name of the user-specific information together with the user unique code to the credible cloud control center;

the service provider is configured to generate a unique code according to the service provider's specific information and transmit an encrypted name of the service provider's specific information together with the generated unique code to the credible cloud control center; and the credible cloud control center is configured to authenticate the terminal and the service provider according to their respective unique codes, and when determining that both the terminal and the service provider pass the authentication, transmit a communication code to the terminal and the service provider so that the terminal and the service provider communicate with each other according to the communication code to complete a current service, wherein the communication code comprises a one-time secret key and a digital certificate, wherein the terminal is further configured to, after the current service is completed, notify the service provider to delete the communication code and the service provider's unique code, and notify the credible cloud control center to delete the communication code and unique codes of the terminal and of the service provider, wherein the credible cloud control center decrypts the name of user-specific information transmitted by the terminal, finds user-specific information in the credible cloud control center's storage server corresponding to the decrypted name of the user-specific information and generates a corresponding character string using a hash algorithm, and compares the generated character string the user unique code transmitted by the terminal, wherein if the comparison indicates that they are the same, it indicates that the terminal passes the authentication, otherwise, it indicates that the terminal does not pass the authentication; and the credible cloud control center generates a character string corresponding to the decrypted name of service-provider-specific information using a hash algorithm, compares the character string to a unique code transmitted by the service provider, wherein if the comparison indicates that they are the same, it indicates that the service provider passes the authentication, otherwise, it indicates that the service provider does not pass the authentication.

5. A terminal configured to, after initiating a service request, generate a user unique code according to user-specific information in an SIM card, encrypt a name of the user-specific information, and then transmit an encrypted name of the user-specific information together with the user unique code to a credible cloud control center, and the terminal is further configured to receive a communication code sent from the credible cloud control center after the terminal passes authentication by the credible cloud center and communicate, according to the communication code, with a service provider which passes authentication by the credible cloud center, wherein the communication code comprises a one-time secret key and a digital certificate; and the terminal is further configured to, after the current service is completed, notify the service provider to delete the communication code and the service provider's unique code, and notify the credible cloud control center to delete the communication code and unique codes of the terminal and of the service provider, wherein the credible cloud control center decrypts the name of user-specific information transmitted by the terminal, finds user-specific information in the credible cloud control center's storage server corresponding to the decrypted name of the user-specific information and generates a corresponding character string using a hash algorithm, and compares the generated character string the user unique code transmitted by the terminal, wherein if the comparison indicates that they are the same, it indicates that the terminal passes the authentication, otherwise, it indicates that the terminal does not pass the authentication; and the credible cloud control center generates a character string corresponding to the decrypted name of service-provider-specific information using a hash algorithm, compares the character string to a unique code transmitted by the service provider, wherein if the comparison indicates that they are the same, it indicates that the service provider passes the authentication, otherwise, it indicates that the service provider does not pass the authentication.

\* \* \* \* \*